Jan. 13, 1942.  K. R. ELDREDGE  2,269,760
DETONATION INDICATOR
Filed Dec. 26, 1939

INVENTOR
KENNETH R. ELDREDGE

BY *[signature]*
ATTORNEY

Patented Jan. 13, 1942

2,269,760

UNITED STATES PATENT OFFICE 2,269,760

DETONATION INDICATOR

Kenneth R. Eldredge, Berkeley, Calif., assignor to Standard Oil Company of California, San Francisco, Calif., a corporation of Delaware Application December 26, 1939, Serial No. 310,948

4 Claims. (Cl. 177—351)

This invention relates to devices for indicating rapidly changing forces, and particularly refers to an apparatus which will respond to pressure fluctuations, such as those found in the combustion chamber of an internal combustion engine, and is effective to generate a voltage that may be measured to give an indication of the magnitude, rate of change, and other characteristics of said pressure changes.

Heretofore, electrical contactors, bouncing pins, condensers, piezo crystals and the like have been used in an effort to measure or to indicate rapid pressure fluctuations, such as those which occur in the combustion chamber of internal combustion engines, and particularly during that type of combustion which produces detonation or pinging in the chamber. These prior methods have many and serious disadvantages which are well known to those skilled in this art, and particularly are usable only under favorable or laboratory conditions, where the elaborate and delicate control and indicating equipment can properly be handled.

This invention comprehends broadly an improved pick-up unit for transforming rapid fluctuations in a force or a fluid pressure into corresponding voltage changes, actually being a generator of such voltages and, with suitable indicating equipment, adapted to indicate any desired functions of the said force or pressure, such as its average value, instantaneous value, rate of change, and the like. Essentially it includes an element of a magnetostrictive material, for example an alloy of about 52% nickel and 48% iron, with only traces of other substances, said element adapted to be mechanically stressed by the said fluctuations, and incorporated in a magnetic circuit one part of which constitutes a so-called permanent magnet. A coil or winding is associated with the magnetostrictive element and, when the magnetic permeability of the element is modified by the stresses, the quantity of flux in the magnetic circuit is correspondingly modified, resulting in an induced voltage in the winding, which may be indicated directly by suitable instruments or may be amplified or modified and used to actuate visual or other types of indicators of various types, some of which are described below.

It is an object of this invention to provide an improved force or pressure responsive unit adapted to generate a voltage which is a function of the force or pressure change, which will be responsive to very high frequencies or rates of change of pressure or force and which will involve no moving parts in its construction or in contact with the fluid in which the pressure is to be measured, or the object which exerts the force to be determined.

Another object is to provide a pressure responsive means that is adapted to indicate rapidly varying pressure conditions in a combustion chamber of an internal combustion engine, such as are caused by detonation of the burning gases therein.

Another object is to provide a pressure responsive means and indicating apparatus therefor that will be so simple, economical and compact that they may conveniently be used on aircraft as a regular accessory as well as a special testing means.

Another object is to provide a magnetostrictive arrangement for measuring force variations that is self-energizing and hence needs no exciting current.

Another object is to provide an improved arrangement of a pressure-responsive unit and an indicator for peak pressures such as those caused by detonation in an internal combustion engine.

These and other objects and advantages will be further apparent from the following description and from the attached drawing, which forms a part of this specification and illustrates a preferred embodiment of the invention as well as an alternative form, together with several indicators usable in connection with it.

Figure 1:
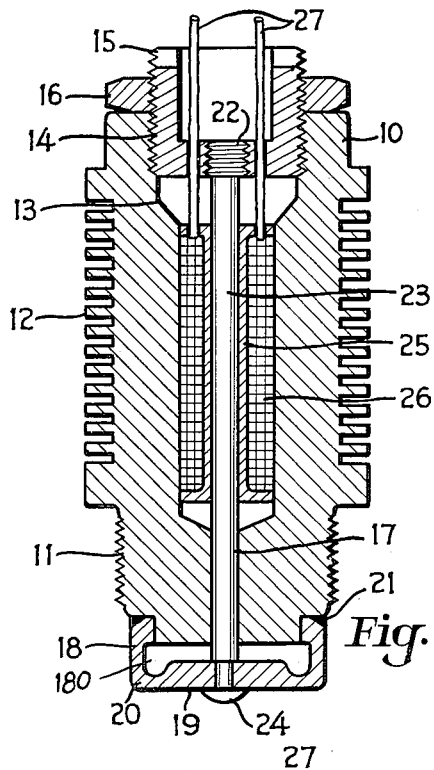
Figure 1 is a longitudinal sectional view of a magnetostrictive pressure-responsive unit.

Referring to the drawing and particularly to Figure 1, reference numeral 10 designates a rigid and generally cylindrical body or housing for one form of indicator. Housing 10 is threaded at 11 to be received in a similarly threaded opening in an engine cylinder head or other source of pressure, and where high temperatures are involved body 10 is preferably provided with cooling means, such as spaced circumferential fins 12. In this embodiment, body 10 is made of steel or some other paramagnetic material so as to be a good conductor for magnetic flux. An axial bore 13 extends throughout body 10 and is enlarged at its upper end and threaded at 14 to receive a plug 15 which may be secured in any desired position by a lock nut 16. The lower portion of bore 13 is restricted as at 17 for a purpose which will be discussed below. The lower end of bore 13 is closed by a slightly flexible cap or diaphragm member 18 which is preferably thicker at its center 19 than at the edges 20 to localize its flexibility and to transmit more effectively a force due to pressure against its lower surface. Diaphragm 18 may be secured to the lower end of body 10 by a circumferential weld 21, to form a chamber 180.

In this example plug 15 is threaded at 22 to receive a rod 23 which extends axially throughout bore 13 in body 10 and is secured to diaphragm 18 by means, such as the riveted connection 24. Any or all of the parts comprising body 10, plug 15, and diaphragm 18 are made of material which may be permanently magnetized with one pole at the upper end of rod 23 and the other at or near the lower end. If diaphragm 18 is made of non-magnetic material, the lower magnetic pole may be in that portion of body 10 traversed by the restricted portion 17 of bore 13. The effect of this arrangement is to provide a magnetic circuit, a part of which is in the magnetostrictive rod 23, the remainder being in the outer portions of the unit, one of the components of the latter being permanently magnetized to cause a magnetic flux to pass through the unit and through the magnetostrictive rod.

There are many types of magnetostrictive material that are suitable for rod 23, one being an alloy of about 52% nickel, 48% iron and only traces of other elements. Generally, the magnetostrictive material may be defined as one which changes its permeability or ease of conducting a magnetic flux with a change in the physical stress exerted on a body of the said material. The arrangement just described provides a rigid body or housing 10 with a flexible means 18 against which a varying pressure is adapted to act to produce varying stresses in the magnetostrictive rod 23, together with a permanently magnetized source of magnetic flux which traverses the rod 23. Due to the effect just described, the amount of flux traversing rod 23 will be varied in accordance with the varying pressures exerted against diaphragm 18.

In order to determine the extent of the flux changes in rod 23, an insulating spool 25 is adapted to support a winding 26 of insulated wire to form a coil in which a varying voltage is induced. Leads 27 are provided to connect winding 26 to any suitable voltage indicator, such as one of those which will be described below.

The dimensions of the various parts of the pressure responsive unit just described may be made to suit the conditions under which it is to be used. The natural longitudinal vibration period of rod 23 should be appreciably shorter than the period of the frequency of the pressure changes to be measured, as at resonance very large changes may occur in voltage output of the unit for small changes in frequency even with constant pressure on diaphragm 18.

Figure 2:
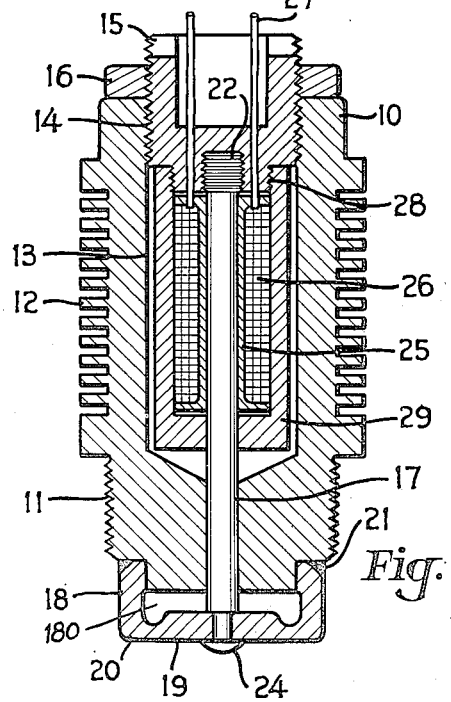
Figure 2 is a longitudinal sectional view of an alternative form of unit similar to that of Figure 1.

In Figure 2 is shown an alternative form of the pressure responsive unit just described. In that arrangement body 10 may be of a material, such as bronze or the like, which is not a good conductor of magnetic flux. In that example plug 15 is made of a paramagnetic material, such as iron or steel, and is provided with a downwardly extending threaded portion 28 onto which may be threaded a cup-shaped magnetized member 29 to surround rod 23, spool 25 and winding 26. The bottom of body 29 is machined at 30 to fit closely around rod 23, the magnetic circuit being completed at that juncture. By this arrangement only a portion of the magnetostrictive rod 23 is used to complete the magnetic circuit formed by the magnetized cup 29 and the lower portion of plug 15. The restricted portion 17 of bore 13 in body 10 may serve to introduce a degree of magnetic damping in the lower portion of rod 23 which has been found to be desirable in some applications of this unit.

Figure 3:
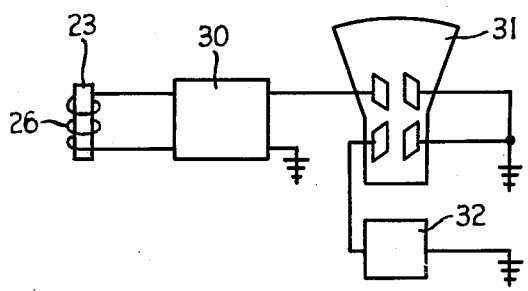
Figure 3 is a connection diagram of an indicator circuit using a cathode ray oscillograph for visually indicating the rate of change of pressure.
Figure 4:
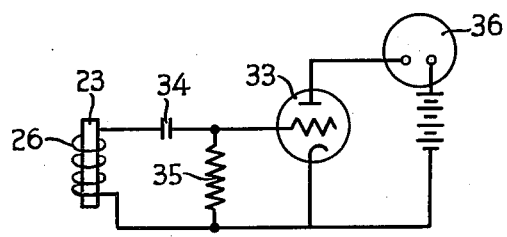
Figure 4 is a connection diagram of another form of indicator circuit in which the average rate of change of pressure is indicated on a direct current meter.
Figure 5:
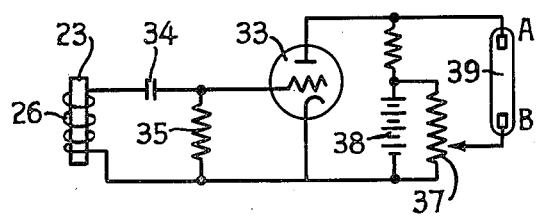
Figure 5 is a connection diagram of another form of indicator circuit in which the average rate of change of pressure is indicated by means of a gas-filled tube, such as a neon tube.

To indicate the varying voltage output of either of the units of Figures 1 and 2, any suitable voltage measuring device may be used. Figures 3, 4 and 5 illustrate examples which have been found to be particularly suitable for the determination of high frequency fluctuating pressures which accompany detonation in internal combustion engines. Figure 3 illustrates diagrammatically a means for indicating rate of change of pressure and by suitable known apparatus may be used to show a conventional pressure-volume diagram.

In Figure 3, reference numeral 23 designates the magnetostrictive element and its accompanying permanently magnetized source of magnetic flux, and numeral 26 designates the winding associated therewith. The varying voltage output from this unit is passed into a suitable amplifier 30 whose output is impressed upon a cathode ray oscillograph which is modulated by an oscillator 31 or any other desired means to introduce a time, displacement or other spreading factor on that portion of deflector plates which move the cathode ray beam in a direction at right angles to that caused by the voltage to be indicated.

Figure 4 illustrates an arrangement in which the variable voltage output of winding 26 is impressed upon the grid circuit of a vacuum tube 33 through a condenser 34 and a resistor 35, these comprising a so-called grid-leak detector circuit which is well known in the radio art. A suitable direct current meter 36 is connected in the plate circuit of tube 33 and may be calibrated to show an average of the quantity of detonation in an engine cylinder to which the magnetostrictive pick-up unit is connected. This arrangement and the one described below, make simple and desirable substitutes for the conventional "bouncing pin" and other types of engine detonation indicators and with greatly improved results.

Figure 5 illustrates an alternative arrangement of detonation indicator in which the same arrangement of grid-leak detector is used but with a variable resistor 37 shunted across the plate battery 38 of the plate circuit. A gas-filled tube 39, for example a neon tube, is variably connected across resistor 37 and may be used to indicate the voltage changes in the plate circuit. A tube of this kind usually requires an initial potential difference of about 150 volts to start a glow from electrode B, this glow extending throughout the tube to A with an added potential difference of about 50 volts.

This invention obviously is not limited to varying fluid pressure measurement, but may be utilized wherever varying mechanical forces, whose characteristics are to be determined, can be applied to a magnetostrictive element which comprises part of a magnetic flux path set up by a permanent magnet, the changes in flux caused by varying permeability of the circuit being determinable by means such as a winding whose field includes part of said flux path, preferably that through the magnetostrictive element, the voltage induced in said winding furnishing an indication of the magnitude, frequency, or other desired properties of said forces.

Thus it will be appreciated that a new and simple type of variable mechanical force or pressure indicator has been described, that is effective to generate a potential varying with the changes in the mechanical force or pressure and to indicate the latter with a high degree of accuracy and with no moving parts in contact with the forces or fluids whose pressures are to be determined. Obviously there are many changes that could be made from the specific example given, without departing from the invention, and it is to be understood that all such changes that fall within the scope of the appended claims are embraced thereby.

I claim:

1. A pressure change pickup unit comprising a body, a diaphragm spaced from the inner end of said body to form a chamber, the outer face of said diaphragm adapted to be exposed to the pressures to be detected, an axial bore extending throughout said body between said diaphragm chamber and the outer end of said body, the outer end of said bore being enlarged to form a second chamber, a winding in said second chamber, means for impressing a magnetic field on said winding, retaining means in the outer end of said bore, a rod of magnetostrictive material extending through said winding and rigidly secured between said retaining means and said diaphragm, the natural longitudinal period of vibration of said rod being appreciably shorter than the period of the frequency of the pressure changes to be measured to prevent resonance therewith, the inner end of said bore in said body between the winding chamber and the diaphragm chamber being restricted closely to surround a portion of said rod intermediate its ends, whereby rapidly varying pressure changes such as are caused by detonation in an engine cylinder will induce corresponding potential changes in said winding.

2. A pressure change pickup unit comprising a magnetized body, a diaphragm spaced from the inner end of said body to form a chamber, the outer face of said diaphragm adapted to be exposed to the pressures to be detected, an axial bore in said body, a winding in said bore, retaining means at the outer end of said bore, a rod of magnetostrictive material extending through said winding and rigidly secured between said retaining means and said diaphragm, the natural longitudinal period of said rod being appreciably shorter than the period of the frequency of the pressure changes to be measured to prevent resonance therewith, and means in said body closely surrounding said rod between said winding and said diaphragm, whereby rapidly varying pressure changes such as are caused by detonation in an engine cylinder will induce corresponding potential changes in said winding.

3. A pressure change pickup unit for internal combustion engine cylinders comprising a hollow elongated magnetized steel body, a diaphragm secured to the inner end of said body and adapted to be sealed into an opening in said engine cylinder, a winding in said body, a rod of magnetostrictive material extending into said winding, retaining means in said body for the outer end of said rod, the inner end of said rod being secured to said diaphragm, the natural period of vibration of said rod being shorter than the period of the pressure changes to be measured to prevent resonance therewith, and means in said body closely surrounding said rod between said winding and said diaphragm, whereby pressure changes due to detonation in said engine cylinder will induce corresponding potential changes in said winding.

4. A pressure change pickup unit for internal combustion engine cylinders comprising a hollow elongated steel body, a diaphragm secured to the inner end of said body, said body provided with means for sealing the end of the body and said diaphragm into an opening in said engine cylinder, a winding in said body, an elongated magnetostrictive element extending into said winding, retaining means in said body for the outer end of said element, the inner end of said element being secured to said diaphragm, the natural longitudinal period of vibration of said element being shorter than the period of the pressure changes to be measured to prevent resonance therewith and the diameter of said element being substantially smaller than that of said diaphragm, and means in said body for impressing an initial magnetic flux on said element, whereby pressure changes due to detonation in said engine cylinder will induce corresponding potential changes in said winding.

KENNETH R. ELDREDGE.